(12) United States Patent
Bhagwan et al.

(10) Patent No.: US 10,554,384 B2
(45) Date of Patent: Feb. 4, 2020

(54) AGGREGATION OF ENCRYPTED DATA

(71) Applicant: Microsoft Technology Licensing, LLC, Redmond, WA (US)

(72) Inventors: Ranjita Bhagwan, Bangalore (IN); Nishanth Chandran, Bangalore (IN); Ramachandran Ramjee, Bangalore (IN); Harmeet Singh, Karnataka (IN); Antonios Papadimitriou, Philadelphia, PA (US); Saikrishna Badrinarayanan, Los Angeles, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 332 days.

(21) Appl. No.: 15/406,597

(22) Filed: Jan. 13, 2017

(65) Prior Publication Data

US 2017/0272235 A1 Sep. 21, 2017

(30) Foreign Application Priority Data

Mar. 17, 2016 (IN) .............................. 201641009424

(51) Int. Cl.
*H04L 9/00* (2006.01)
*G06F 7/50* (2006.01)
(Continued)

(52) U.S. Cl.
CPC ................ *H04L 9/008* (2013.01); *G06F 7/50* (2013.01); *G06Q 20/401* (2013.01); *H04L 9/0618* (2013.01); *G06Q 2220/12* (2013.01)

(58) Field of Classification Search
CPC ......... H04L 9/008; H04L 9/0618; G06F 7/50; G06Q 20/401; G06Q 2220/12
(Continued)

(56) References Cited

U.S. PATENT DOCUMENTS 4,423,287 A * 12/1983 Zeidler .................. G06Q 20/02
235/379
8,626,749 B1 1/2014 Trepetin et al.
(Continued)

FOREIGN PATENT DOCUMENTS

CN 101401341 * 1/2009
EP 1146411 A1 10/2001

OTHER PUBLICATIONS

"Apache Spark is a Fast and General engine for Large-Scale Data Processing", Retrieved from: http://spark.apache.org/, Retrieved Date: Aug. 3, 2016, 4 Pages.
(Continued)

*Primary Examiner* — Harunur Rashid
*Assistant Examiner* — Sakinah White Taylor
(74) *Attorney, Agent, or Firm* — Schwegman Lundberg & Woessner, P.A.

(57) ABSTRACT

In some embodiments, an encryption system secures data using a homomorphic encryption. The encryption system encrypts a number by encrypting a number identifier of the number and combining the number and the encrypted number identifier using a mathematical operation to generate an encrypted number. The encrypted numbers may be stored at a server system along with their number identifiers. The server system can then generate an aggregation (e.g., sum) of the encrypted numbers and provide the aggregation, the encrypted numbers, and the number identifiers. The encryption system can then separate the aggregation of the numbers from the aggregation of the encrypted numbers using an inverse of the mathematical operation used in the encryption to effect removal of an aggregation of the encrypted number identifiers of the numbers from the aggregation of the encrypted numbers. The separated aggregation of the numbers is an aggregation of the plurality of the numbers.

13 Claims, 11 Drawing Sheets

(51) Int. Cl.
    *G06Q 20/40* (2012.01)
    *H04L 9/06* (2006.01)
(58) Field of Classification Search
    USPC .......................................................... 380/29
    See application file for complete search history.

(56) References Cited

U.S. PATENT DOCUMENTS

| | | | |
|---|---|---|---|
| 8,635,465 B1* | 1/2014 | Juels | G06F 21/602 |
| | | | 713/193 |
| 9,087,212 B2 | 7/2015 | Balakrishnan et al. | |
| 9,143,317 B2 | 9/2015 | Chevallier-Mames et al. | |
| 9,213,764 B2 | 12/2015 | Kerschbaum et al. | |
| 9,946,810 B1* | 4/2018 | Trepetin | G06F 17/30979 |
| 2007/0140479 A1 | 6/2007 | Wang | H04L 9/008 |
| | | | 380/30 |
| 2007/0171050 A1 | 7/2007 | Westhoff et al. | |
| 2008/0228933 A1* | 9/2008 | Plamondon | H03M 7/30 |
| | | | 709/230 |
| 2010/0082970 A1* | 4/2010 | Lindahl | H04L 9/0891 |
| | | | 713/150 |
| 2011/0145593 A1 | 6/2011 | Auradkar | |
| 2011/0264920 A1 | 10/2011 | Rieffel et al. | |
| 2012/0084554 A1 | 4/2012 | Van Gorp et al. | |
| 2013/0111205 A1 | 5/2013 | Biswas | |
| 2013/0191650 A1 | 7/2013 | Balakrishnan et al. | |
| 2014/0101438 A1 | 4/2014 | Elovici et al. | |
| 2014/0310524 A1* | 10/2014 | Yamanaka | H04L 9/3242 |
| | | | 713/170 |
| 2015/0039912 A1 | 2/2015 | Payton et al. | |
| 2015/0295716 A1 | 10/2015 | Liu | |
| 2016/0147779 A1 | 5/2016 | Eguro et al. | |
| 2017/0103217 A1 | 4/2017 | Arasu et al. | |
| 2017/0150347 A1 | 5/2017 | Kowalevicz et al. | |
| 2017/0235969 A1 | 8/2017 | Kamara et al. | |
| 2017/0308580 A1 | 10/2017 | Naganuma et al. | |
| 2018/0006820 A1 | 1/2018 | Arasu et al. | |
| 2018/0076951 A1 | 3/2018 | Bhagwan et al. | |

OTHER PUBLICATIONS

"ARM Security Technology Building a Secure System using TrustZone Technology", In White Paper of ARM Architecture for the Digital World, Retrieved Date: Aug. 3, 2016, 108 Pages.

"Big Data Analytics over Encrypted Datasets with Seabed", Retrieved from: https://sites.google.com/site/seabedosdi2016/tr.pdf, Retrieved Date: Aug. 3, 2016, 22 Pages.

"Big Data Benchmark", Retrieved from: https://amplab.cs.berkeley.edu/benchmark/, Retrieved Date: Aug. 3, 2016, 7 Pages.

"CryptoCards", Retrieved from: https://web.archive.org/web/20170117031420/http://www-03.ibm.com:80/security/cryptocards/, Retrieved Date: Aug. 3, 2016, 3 Pages.

"Google Protocol Buffers", Retrieved from: https://developers.google.com/protocol-buffers/, Retrieved Date: Jun. 27, 2018, 1 Page.

"IBM Analytics", Retrieved from: https://www.ibm.com/analytics/, Aug. 3, 2016, 5 Pages.

"PowerBI", Retrieved from: https://powerbi.microsoft.com/en-us/features/, Aug. 3, 2016, 8 Pages.

"Tableau Online", Retrieved from: https://www.tableau.com/products/cloud-bi, Retrieved Date: Aug. 3, 2016, 9 Pages.

"Non Final Office Action Issued in U.S. Appl. No. 15/331,715", dated Apr. 19, 2018, 27 Pages.

"Non Provisional Application Filed under Indian Application No. 201641009424", Filed Date: Mar. 17, 2016, 29 Pages.

Arasu, et al., "Orthogonal Security with Cipherbase", In Proceedings of 6th Biennial Conference on Innovative Data Systems Research, Jan. 8, 2013, 10 Pages.

Bajaj, et al., "TrustedDB: A Trusted Hardware-Based Database with Privacy and Data Confidentiality", In Proceedings of the ACM SIGMOD International Conference on Management of data, vol. 26, Issue 3, Jun. 12, 2011, pp. 752-764.

Bellare, et al., "Deterministic and Efficiently Searchable Encryption", In Proceedings of the International Symposium on Cryptography, Aug. 19, 2007, 43 Pages.

Bhagwan, et al., "Adtributor: Revenue debugging in advertising systems", In Proceedings of the 11th USENIX Conference on Networked Systems Design and Implementation, Apr. 2, 2014, 14 Pages.

Boldyreva, et al., "Order-preserving symmetric encryption", In Proceedings of the 28th Annual International Conference on Advances in Cryptology: the Theory and Applications of Cryptographic Techniques, Apr. 26, 2009, 18 Pages.

Boneh, et al., "Evaluating 2-DNF Formulas on Ciphertexts", In Proceedings of the Second International Conference on Theory of Cryptography, Feb. 10, 2005, pp. 325-341.

C, David, "Five Things to Know about Databases that Leverage Partially Homomorphic Encryption", Retrieved from: https://gab41.lab41.org/five-things-to-know-about-databases-that-leverage-partially-homomorphic-encryption-794b1e49119b, Jun. 14, 2016, 8 Pages.

Chambi, et al., "Better Bitmap Performance with Roaring Bitmaps", In Journal of Software: Practice and Experience vol. 46, Issue 5, May, 2016, pp. 709-719.

Chenette, et al., "Practical order-revealing encryption with limited leakage", In Proceedings of the 23rd International Conference on Fast Software Encryption, Mar. 20, 2016, pp. 474-493.

Coston, et al., "Intel SGX Explained", In Journal IACR Cryptology ePrint Archive, vol. 86, Feb. 2016, pp. 1-117.

Davenport, et al., "SGX: the good, the bad and the downright ugly", In Virus Bulletin, Jan. 7, 2014, 4 Pages.

Deutsch, P, "Deflate Compressed Data Format Specification version 1.3", Retrieved from: https://tools.ietf.org/html/rfc1951, May, 1996, 15 Pages.

Dinh, et al., "M2R: Enabling Stronger Privacy in Mapreduce Computation", In the Proceedings of the 24th USENIX Security Symposium, Aug. 12, 2015, pp. 447-462.

Ge, et al., "Answering aggregation queries in a secure system model", In Proceedings of the 33rd International Conference on Very Large Data Bases, Sep. 23, 2007, pp. 519-530.

Gentry, Craig, "Fully Homomorphic Encryption Using Ideal Lattices", In Proceedings of the forty-first annual ACM symposium on Theory of computing, May 31, 2009, pp. 169-178.

Gentry, et al., "Homomorphic Evaluation of the AES Circuit", In Proceedings of the 32nd Annual Cryptology Conference on Advances in Cryptology, Aug. 19, 2012, pp. 850-867.

Gentry, et al., "Homomorphic Evaluation of the AES Circuit (Updated Implementation)", Retrieved from: https://eprint.iacr.org/2012/099.pdf, Jan. 3, 2015, 35 Pages.

Goldreich, et al., "Software Protection and Simulation on Oblivious RAMs", In Journal of ACM, vol. 43, Issue 3, May 1996, pp. 431-473.

Kambatla, et al., "Trends in big data analytics", In journal of Parallel and Distributed Computing, vol. 74, Issue 7, Jul. 1, 2014, pp. 2561-2573.

Lacharite, et al., "A note on the optimality of frequency analysis vs. lp-optimization", In Journal of Cryptology ePrint Archive, Nov. 30, 2015, 3 Pages.

Lee, et al., "The Unified logging Infrastructure for Data Analytics at Twitter", In Proceedings of 38th International Conference on Very large Data Bases, vol. 5, Issue 12, Aug. 27, 2012, pp. 1771-1780.

Lemire, et al., "Decoding billions of integers per second through vectorization", In Journal of Software- Practice and Experience, vol. 45, Issue 1, Jan. 1, 2015, pp. 1-29.

Liu, et al., "Ensuring Data Storage Security against Frequency-Based Attacks in Wireless Networks", In Proceedings of 6th IEEE International Conference on Distributed Computing in Sensor Systems, Jun. 21, 2010, pp. 201-215.

McKeen, et al., "Innovative Instructions and Software Model for Isolated Execution", In Proceedings of the 2nd International Workshop on Hardware and Architectural Support for Security and Privacy, Jun. 23, 2013, pp. 1-8.

(56) References Cited

OTHER PUBLICATIONS

Naveed, et al., "Inference attacks on Property-Preserving Encrypted Databases", In Proceedings of the 22nd ACM SIGSAC Conference on Computer and Communications Security, Oct. 12, 2015, pp. 644-655.
Ostrovsky, Rafail, "Efficient Computation on Oblivious RAMs", In Proceedings of the twenty-second annual Acm symposium on Theory of Computing, May 13, 1990, pp. 514-523.
Paillier, Pascal, "Public-key cryptosystems based on composite degree residuosity classes", In Proceedings of the 17th international conference on Theory and application of cryptographic techniques, May 2, 1999, pp. 223-238.
Popa, et al., "CryptDB: Protecting Confidentiality with Encrypted Query Processing", In Proceedings of the Twenty-Third ACM Symposium on Operating Systems Principles, Oct. 23, 2011, pp. 85-100.
Schuster, et al., "VC3: Trustworthy Data Analytics in the Cloud Using SGX", In Proceedings of the IEEE Symposium on Security and Privacy, May 17, 2015, pp. 38-54.
Sumbaly, et al., "The "Big Data" Ecosystem at linkedIn Cloud", In Proceedings of ACM SIGMOD International Conference on Management of Data, Jun. 22, 2013, 10 Pages.
Tsoutsos, et al., "HEROIC: homomorphically EncRypted one instruction computer", In Proceedings of the Conference on Design, Automation & Test in Europe Computer, Mar. 24, 2014, pp. 1-6.
Tu, et al., "Processing analytical queries over encrypted data", In Proceedings of the 39th international conference on Very Large Data Bases, vol. 6, Issue 5, Mar. 2013, pp. 289-300.
Vaswani, et al., "Information Flows in Encrypted Databases", In Journal of Computing Research Repository, May 3, 2016, pp. 1-12.
Wang, et al., "Towards Practical Private Processing of Database Queries over Public Data with Homomorphic Encryption", In Journal of Distributed and Parallel Databases vol. 32, Issue 1, Mar. 2014, 13 Pages.
Lim, et al., "Faster Secure Arithmetic Computation Using Switchable Homomorphic Encryption," In the International Association for Cryptologic Research, Jul. 11, 2014, 25 Pages.
"International Search Report and Written Opinion Issued in PCT Application No. PCT/US2017/021698," dated Jun. 2, 2017, 13 Pages.
Lauter, et al., "Can Homomorphic Encryption be Practical?", In Proceedings of 3rd ACM Workshop on Cloud Computing Security Workshop, Oct. 21, 2011, pp. 1-18.
Grofig, et al., "Privacy by Encrypted Databases," In Proceedings of Second Annual Privacy Forum, May 20, 2014, 14 pages.
Sharma, Iti, "Fully Homomorphic Encryption Scheme with Symmetric Keys," In Dissertation of Master of Technology, Aug. 2013, 64 pages.
Catalano, et al., "Using Linearly-Homomorphic Encryption to Evaluate Degree-2 Functions on Encrypted Data," In Proceedings of 22nd ACM SIGSAC Conference on Computer and Communications Security, Oct. 12, 2015, pp. 1518-1529.
Akin, et al., "On the Difficulty of Securing Web Applications using CryptDB," In Proceedings of IEEE Fourth International Conference on Big Data and Cloud Computing, Dec. 3, 2014, 8 pages.
Zhao, et al., "Secure Genomic Computation through Site-Wise Encryption," In Proceedings of AMIA Joint Summits on Translational Science, Mar. 25, 2015, pp. 227-231.
Wang, et al., "Is Homomorphic Encryption the Holy Grail for Database Queries on Encrypted Data?", In Technical Report, Jan. 2012, pp. 1-18.
Dong, et al., "A Fast Secure Dot Product Protocol with Application to Privacy Preserving Association Rule Mining," In Proceedings of 18th Pacific-Asia Conference on Knowledge Discovery and Data Mining, May 13, 2014, 12 pages.
Christen, Peter, "Data Matching," In Publication of Springer-Verlag Berlin Heidelberg, Retrieved on: Jan. 8, 2016, 279 pages.
Islam, et al., "Access Pattern disclosure on Searchable Encryption: Ramification, Attack and Mitigation," In Proceedings of 19th Annual Network and Distributed System Security Symposium, Feb. 7, 2012, 15 pages.

* cited by examiner store table 110

| store ID | location |
|---|---|
| C101 | India |
| B210 | China |
| E405 | India |
| ... | ... |
| C102 | U.K. | transaction table 120

| store ID | transaction ID | amount |
|---|---|---|
| B210 | 1 | E(29) |
| C102 | 1 | E(101) |
| B210 | 2 | E(15) |
| ... | ... | ... |
| C101 | 501 | E(55) |

*FIG. 1*

AGGREGATION OF ENCRYPTED DATA

BACKGROUND

A cloud data center may provide cloud computing services to various computing systems such as desktops, laptops, tablets, smartphones, embedded computers, point-of-sale terminals, and so on. A cloud data center may have many thousands of servers and storage devices and provide various software products such as operating systems, databases, and applications. Rather than maintaining their own data centers, many enterprises subscribe as customers of a database service of a cloud data center to store and process their data. For example, a retail company may subscribe to a database service to store records of the sales transactions at the company's stores and use an interface provided by the database service to run queries to help in analyzing the sales data. As another example, a utility company may subscribe to a database service for storing meter readings collected from the meters of its customers. As another example, a governmental entity may subscribe to a database service for storing and analyzing tax return data of millions of taxpayers.

Enterprises that subscribe to such cloud-based database services want to ensure the privacy of their data. Although cloud data centers employ many sophisticated techniques to help preserve the privacy of customer data, parties seeking to steal such customer data are continually devising new counter-techniques to access the data. To help ensure the privacy of their data, many customers may encrypt their data locally before sending their data for storage by a database service. For example, each point-of-sale terminal of a retail company may encrypt the sale amount of each transaction and send the sale amount only in an encrypted form to the database service as a record of the transaction. If the retail company wants to determine the total sale amount for each store, the encrypted sale amounts for each store would need to be downloaded to a company computer and then decrypted. The decrypted sale amounts for each store could then be added together to generate the total sale amount for each store.

If a customer were to use a homomorphic encryption of data, then the downloading and decrypting of all the sales data could be avoided. Homomorphic encryption has the characteristic that a computation performed on the encrypted data generates an encrypted result that, when decrypted, equals the same result as if the computation was performed on the unencrypted data. For example, if the retail company homomorphically encrypts its sale amounts, then the database service could add the encrypted sale amounts for each store to generate an encrypted total sale amount for each store. The retail company need only download the encrypted total sale amount for each store and decrypt those total sale amounts.

Although homomorphic encryption allows the aggregation of encrypted data to be performed by the database service and thus avoids the downloading of the unaggregated encrypted data, homomorphic encryption can be very computationally expensive. Homomorphic encryption schemes typically use complex mathematical operations such as multiplications, exponentiations, matrix operations, and so on. As a result, many organizations either choose not to use homomorphic encryption or need to expend significant amounts of money purchasing additional computational power that is needed to support homomorphic encryption.

SUMMARY

In some embodiments, an encryption system secures data using a homomorphic encryption. The encryption system encrypts a number by encrypting a number identifier of the number and combining the number and the encrypted number identifier using a mathematical operation to generate an encrypted number. The encrypted numbers may be stored at a server system along with their number identifiers. The server system can then generate an aggregation (e.g., sum) of the encrypted numbers and provide the aggregation, the encrypted numbers, and the number identifiers. The encryption system can then separate the aggregation of the numbers from the aggregation of the encrypted numbers using an inverse of the mathematical operation to effect removal of an aggregation of the encrypted number identifiers of the numbers from the aggregation of the encrypted numbers. The separated aggregation of the numbers is an aggregation of the plurality of the numbers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION

FIG. 1 is a diagram illustrating data structures stored by a cloud data center in some embodiments.

DETAILED DESCRIPTION

Figure 2:
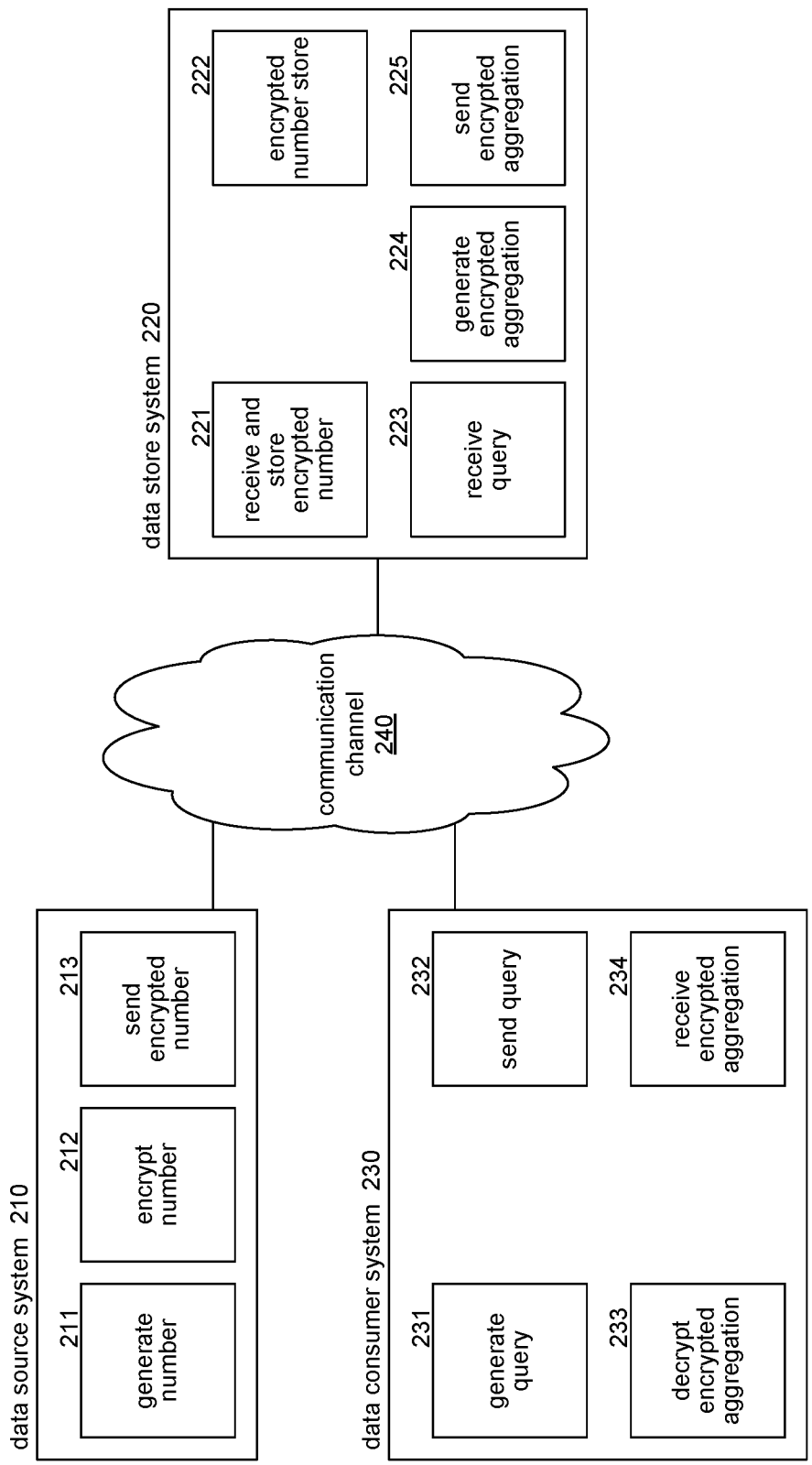
FIG. 2 is a block diagram that illustrates systems that support an encryption system in some embodiments.

A method and system for homomorphic encryption of data is provided. In some embodiments, an encryption system executing at a data source system homomorphically encrypts a number using a number identifier associated with that number. For example, if the data source system is a point-of-sale terminal of a store of a retail company and the number represents the sale amount of a transaction, then the number identifier may be a combination of a store identifier and a record identifier for that transaction. To encrypt the number, the encryption system generates random value that is a function of the number identifier associated with the number. The encryption system generates the random value by applying a pseudorandom function ("PRF") to a symmetric key and the number identifier. The encryption system may use any type of pseudorandom function. For example, the encryption system may use the Advanced Encryption Standard ("AES") algorithm or the Data Encryption Standard ("DES") algorithm as the pseudorandom function to generate the random value. Since an encryption algorithm is used to generate the random value in some embodiment, the random value generated by the pseudorandom function may be referred to as an "encryption of the number identifier." Continuing with the retail company example, if the store identifier is 10 and the transaction identifier is a numeric representation of date and time (e.g., seconds since 1900), then the number identifier of the sale amount may have 10 in its most significant bits and the numeric representation of date and time in its least significant bits. The encryption of the number identifier may be represented as E(ID), where ID represents the number identifier and E represents the PRF algorithm. The encryption system generates the encrypted number by performing a mathematical operation with the number and the encrypted number identifier (i.e., PRF output) as operands. The mathematical operation has a corresponding inverse mathematical operation that is used for decryption. The number can be decrypted from the encrypted number by performing the inverse mathematical operation with the encrypted number and the encrypted number identifier (i.e., PRF output) as operands. The encrypted number may be represented as follows:

$$E(\text{number}) = \text{number} - E(\text{ID})$$

and the decrypted number may be represented as $$\text{number} = E(\text{number}) + E(\text{ID})$$

where addition is the inverse of subtraction. The operations take place in a mathematical group (e.g., for integers mod n from some integer n). The encryption system may encrypt any quantity of numbers using the number identifier of each number. Once the encryption system encrypts a number, it can send the encrypted number to a cloud data center for secure storage.

In some embodiments, the encrypted numbers that have been encrypted with subtraction (or addition) as the mathematical operation can be added together at a cloud data center to generate an aggregation of the encrypted numbers. The cloud data center may receive a request for the aggregation (e.g., a query) from a data consumer system (e.g., management system of a store) that executes the encryption system. For example, if the cloud data center stores the encrypted sale amount for each transaction of a store, the cloud data center can add all the encrypted sale amounts for the store to generate an aggregation that is the sum of the encrypted sale amounts for that store. The sum of the encrypted numbers may be represented as follows:

$$A(E(\text{number}(1 \ldots n))) = \sum_{i=1}^{n} E(\text{number}_i)$$

where A represents the aggregation and number; represents the i-th number. When an aggregation is received, the encryption system can decrypt the aggregation of the encrypted numbers by performing the inverse mathematical operation (e.g., addition) for each number to reverse the mathematical operation (e.g., subtraction) used to encrypt the numbers. If the mathematical operation is subtraction, the decrypting of a summation aggregation of the encrypted numbers with the inverse mathematical operation of addition may be represented as follows:

$$A(\text{number}(1 \ldots n)) = A(E(\text{number}(1 \ldots n))) + \sum_{i=1}^{n} E(ID_i)$$

where $ID_i$ represents the number identifier of the i-th number.

In some embodiments, a cloud data center may provide to the encryption system executing at a data consumer system the number identifiers of the numbers that are used to generate an aggregation. For example, when the aggregation is the sum of the encrypted sale amounts for a store, the encryption system may have used a combination of store identifier and date and time as the number identifier (or record identifier) of a transaction. When the cloud data center generates an aggregation, it provides the number identifier of each transaction used to generate the aggregation. The encryption system can then encrypt each number identifier, generate a sum of the encrypted number identifiers, and add that sum to the aggregation of the encrypted numbers to reverse the mathematical operation of subtracting the encrypted number identifiers from the numbers that they identify. The result of adding the sum to the aggregation of the encrypted numbers is an aggregation of the numbers, which is not encrypted.

In some embodiments, the encryption system may use number identifiers that are sequential. For example, when a transaction occurs, a number identifier for that transaction may be generated by incrementing the number identifier of the previous number that was generated or stored. Continuing with the retail example, such a number identifier may be considered to be a record identifier of a transaction. Each store may be responsible for generating its own sequence of record identifiers for its transactions. If the number identifiers are sequential, the cloud data center may use various compression techniques to compress each range of number identifiers used in an aggregation. The compression techniques may include run-length encoding, range encoding, and so on. For example, if the aggregation is a sum of the sale amounts for the first two Fridays of a certain year, the number identifiers of the transactions may be 10245 through 10344 and 14910 through 15059. If run-length encoding is used, then the compressed sequence of number identifiers would be 10245/100 and 14910/150, where the number before the slash represents the number identifier of the start of the run and the number after the slash represents the length of the run. If range encoding is used, then the compressed sequence would be the number identifiers of the start and end of each range. Even if the number identifiers of numbers used in an aggregation are not in a range or if the number identifiers themselves are not sequential, the number identifiers may be compressed, for example, using a differential encoding. So, if the number identifiers are 10245, 10299, 10303, and 10103, the differential encoding may be 10245/54,4,-200 where the number before the slash represents the first number identifier and the numbers after the slash represent differences to be added to the previous number identifier. Although each number may have a number identifier that is unique, the number identifiers need not be unique. For example, a retail store may generate a new number identifier every hour and encrypt the sale amount of each transaction that occurs during a particular hour with the same number identifier.

In some embodiments, if it is expected that ranges of sequential number identifiers will be used in an aggregation, the encryption system may encrypt each number using the number identifier of that number and the number identifier of an adjacent number in the sequence in a process referred to as sequential encryption. The encryption system may encrypt each number by performing a mathematical operation with the encrypted number identifier of the number and an inverse mathematical operation with the encrypted number identifier of an adjacent number in the sequence of number identifiers. Such sequential encryption may be represented as follows:

$$E(\text{number}_i)=\text{number}_i-E(\text{ID}_i)+E(\text{ID}_{i-1})$$

Because each encrypted number includes the inverse mathematical operation used to encrypt an adjacent (e.g., prior) number, when a sequence of encrypted numbers are summed, the mathematical operation of the number identifier of each number in the sequence will be reversed by the inverse mathematical operation of the number identifier of that number in the encryption of the adjacent number in the sequence. For example, the encryption of numbers in a sequence may be represented as follows:

$$\text{number}_5-E(\text{ID}_5)+E(\text{ID}_4)$$

$$\text{number}_6-E(\text{ID}_6)+E(\text{ID}_5)$$

$$\text{number}_7-E(\text{ID}_7)+E(\text{ID}_6)$$

$$\text{number}_8-E(\text{ID}_8)+E(\text{ID}_7)$$

The summation aggregation of these numbers may be represented as follows:

$$\text{number}_5+\text{number}_6+\text{number}_7+\text{number}_8+E(\text{ID}_4)+(E(\text{ID}_5)-E(\text{ID}_5))+(E(\text{ID}_6)-E(\text{ID}_6))+(E(\text{ID}_7)-E(\text{ID}_7))-E(\text{ID}_8)$$

The mathematical operations and the inverse mathematical operations based on the number identifiers for numbers 5-7 result in a sum of zero. Thus, the aggregation of the encrypted numbers can be decrypted by adding the encrypted number identifier of number 4 and subtracting the encrypted number identifier of number 8. If sequential encryption is used for a sequence of numbers of any length, then the summation aggregation can be decrypted using the inverse mathematical operation of the number identifier of a number adjacent to one end of the sequence and the mathematical operation of the number identifier of the number at the other end of the sequence. For example, if the sequence is 1000 numbers in length, then only one mathematical operation and one inverse mathematical operation need to be performed to generate the aggregation of the numbers from the aggregation of the encrypted numbers. If each number were encrypted using only a mathematical operation (i.e., non-sequential encryption) with the number identifier of that number, then 1000 mathematical operations would need to be performed to decrypt the aggregation of the decrypted numbers.

Although the encryption system is described in the context of supporting an aggregation that is a summation, the aggregation can be another type of aggregation. For example, if the aggregation is to be a product of numbers, then the encryption system can encrypt each number by multiplying a number by the encryption of its number identifier. To decrypt the product of such encrypted numbers, the encryption system would divide the product by each of the encrypted number identifiers of the numbers used to generate the product. Also, although the encryption system is described in the context of storing encrypted numbers at a cloud data center, the encryption system may be useful even when the encrypted numbers are stored locally. If only the encrypted numbers are stored locally, a party seeking to steal the numbers would have a very limited window in which to do so (e.g., prior to the numbers being encrypted) and the encrypted numbers need not ever be \decrypted. In some embodiments, the numbers may be encrypted using a cryptoprocessor, so the window may be even more limited.

The encryption system thus allows numbers to be homomorphically encrypted and subsequently decrypted based on number identifiers using much less computational expense than prior homomorphic encryption techniques. In addition, the encryption system allows aggregations of encrypted numbers to be rapidly decrypted, especially when the numbers are encrypted using sequential encryption. The compressing of the number identifiers used in generating an aggregation helps reduce the communication bandwidth needed to provide the number identifiers to a data consumer system. Also, any encryption algorithm can be used to encrypt the number identifiers. In particular, since the encrypted number identifiers need not be decrypted, the encryption system can use an encryption algorithm whose encryption is computationally inexpensive but whose decryption may be computationally expensive.

FIG. 1 is a diagram illustrating data structures stored by a cloud data center in some embodiments. In this example, a database service of a cloud data center maintains a store table 110 and a transaction table 120 for a retail company. The store table contains, for each store, an entry that includes the store identifier and the location of the store. The transaction table contains an entry for each transaction that includes a store identifier, a transaction identifier, and an encrypted amount. The store identifier and transaction identifier combine to form a unique number identifier of the amount. In this example, each amount is encrypted by subtracting an encryption of the number identifier. Each store may generate transaction identifiers that are sequential starting from the number one. The database service may support the querying of the transaction table. For example, a client device (e.g., a data consumer system) may submit a query that specifies to aggregate the amounts of all the transactions for the stores in India. The database service would access the store table to identify the store identifiers of the stores in India and then use those store identifiers to identify entries in the transaction table for transactions of those stores. The database service then would sum the encrypted amounts of those entries to generate an aggregation of the encrypted numbers. The database service may provide the aggregation of the encrypted numbers along with an indication of the number identifiers (e.g., store identifiers and transaction identifiers) as the result of the aggregation. In some embodiments, the client device may maintain sufficient information to track the number identifiers that are used in an aggregation. For example, the client device may know the store identifiers of stores in India and know the first and last transaction identifier used by each store. In such a case, the client device would not need the number identifiers to be provided by the database service.

FIG. 2 is a block diagram that illustrates systems that support an encryption system in some embodiments. The systems include a data source system 210, a data store system 220, and a data consumer system 230 that are connected via a communication channel 240. The data source system is a source of encrypted numbers (e.g., a point-of-sale terminal). The data source system may include a generate number component 211, an encrypt number component 212, and a send encrypted number component 213. The generate number component may be, for example, a component of a transaction system that outputs sale amounts. The encrypt number component encrypts each number using homomorphic encryption. The send encrypted number component sends the encrypted number to the data store system for storage. The data storage system includes a receive and store encrypted number component 221, an encrypted number store 222, a receive query component 223, a generate encrypted aggregation component 224, and a send encrypted aggregation component 225. The receive and store encrypted number component receives encrypted numbers from data source systems and stores the encrypted numbers in the encrypted number store. The encrypted number store stores the encrypted numbers. For example, transaction table 120 is an example of an encrypted number store. The receive query component receives queries from data consumer systems and invokes the generate encrypted aggregation component to aggregate the encrypted numbers that match the query. The send encrypted aggregation component returns the aggregation of the encrypted numbers to a data consumer system. The data consumer system includes a generate query component 231, a send query component 232, a decrypt encrypted aggregation component 233, and a receive encrypted aggregation component 234. A user may interact with the generate query component to generate queries to submit to the data store system. The generate query component may be part of a conventional database system that supports the Structured Query Language ("SQL"). The send query component sends the queries to the data store system. The receive encrypted aggregation component receives the aggregations from the data store system and invokes the decrypt encrypted aggregation component to decrypt the aggregations of the encrypted numbers. Although illustrated as separate systems, a data source system and a data consumer system can be implemented on the same computing system. Also, the data storage system may be implemented on the same computing system as a data source system or a data consumer system.

The computing systems on which the systems that support the encryption system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems of data source systems, data consumer systems, and data storage systems may include desktop computers, laptops, tablets, e-readers, personal digital assistants, smartphones, gaming devices, servers, point-of-sale terminals, and so on. The computing systems may also include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the encryption system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The encryption system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the encryption system may be implemented in hardware using, for example, an application-specific integrated circuit ("ASIC").

Figure 3:
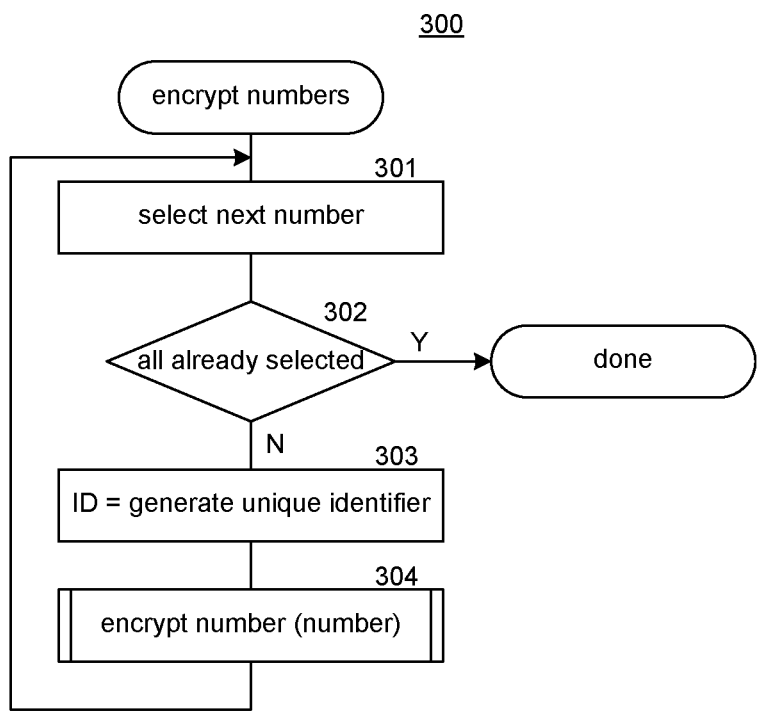
FIG. 3 is a flow diagram that illustrates processing of an encrypt numbers component of a data source system in some embodiments.

FIG. 3 is a flow diagram that illustrates processing of an encrypt numbers component of a data source system in some embodiments. An encrypt numbers component 300 may be invoked to encrypt a sequence of numbers. In block 301, the component selects the next number in the sequence. In decision block 302, if all the numbers have already been selected, then the component completes, else the component continues at block 303. In block 303, the component generates the number identifier of the selected number. For example, in the case of a retail company, the number identifier may be a combination of the store identifier and sequential transaction identifier generated for that store. In block 304, the component invokes an encrypt number component passing an indication of the number to be encrypted. The component then loops to block 301 to select the next number in the sequence.

Figure 4:
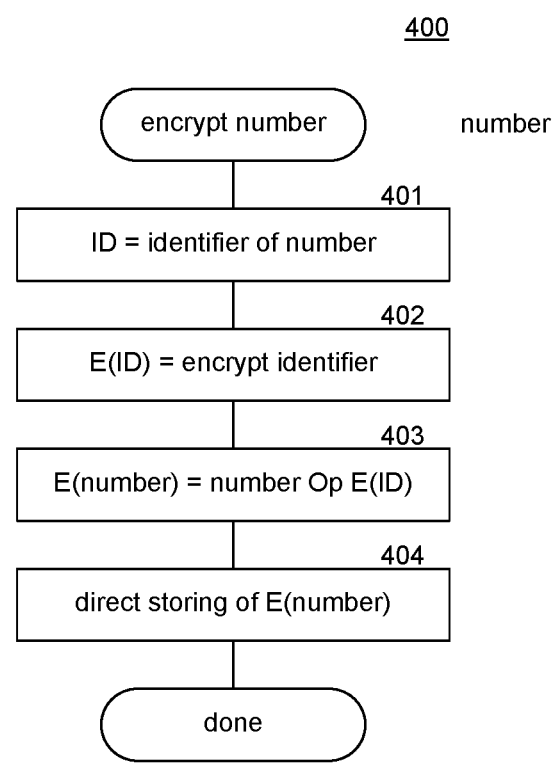
FIG. 4 is a flow diagram that illustrates processing of an encrypt number component of a data source system in some embodiments.

FIG. 4 is a flow diagram that illustrates processing of an encrypt number component of a data source system in some embodiments. An encrypt number component 400 is passed an indication of a number and encrypts the number based on the number identifier of the number. In block 401, the component retrieves the number identifier of the number. In block 402, the component encrypts the number identifier, for example, using an AES algorithm. In block 403, the component encrypts the number by performing a mathematical operation with the number and the encrypted number identifier as operands. In block 404, the component directs the storing of the encrypted number, for example, at a cloud data center, and then completes.

Figure 5:
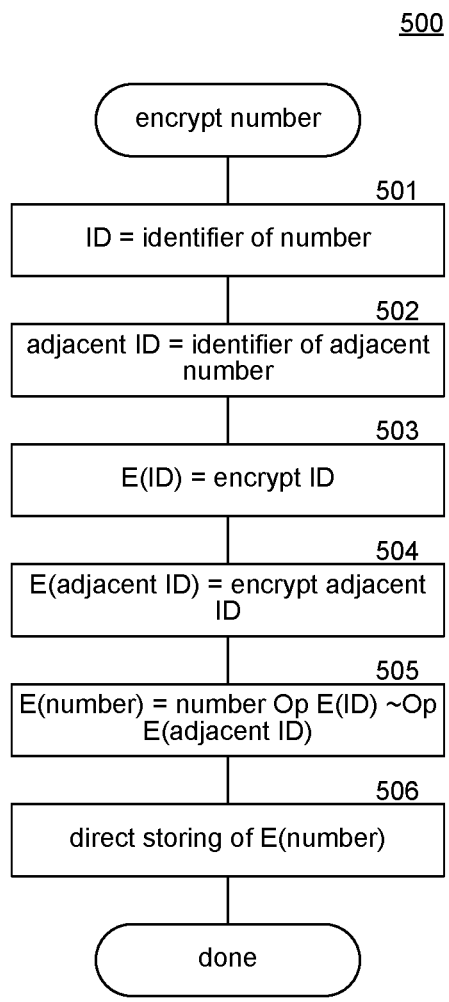
FIG. 5 is a flow diagram that illustrates processing of an encrypt number component that employs sequential encryption of a data source system in some embodiments.

FIG. 5 is a flow diagram that illustrates processing of an encrypt number component that employs sequential encryption of a data source system in some embodiments. An encrypt number component 500 is passed a number and encrypts that number using sequential encryption. In block 501, the component retrieves the number identifier of the number. In block 502, the component retrieves the number identifier of an adjacent number. In block 503, the component encrypts the number identifier of the number. In block 504, the component encrypts the number identifier of the adjacent number. In block 505, the component generates the encrypted number by performing on the number the mathematical operation using the encrypted number identifier of the number and an inverse mathematical operation using the encrypted number identifier of the adjacent number. In block 506, the component directs the storing of the encrypted number and then completes. As used herein, the number identifiers may be considered to be sequential and the numbers themselves may be considered to be sequential.

Also, the term "sequential" does not imply that the values of the number identifiers or the numbers are sequential. For example, the values of the sale amounts would be considered to be sequential in the sense, for example, that the value of one sale amount in the sequence is greater than the value of the prior sale amount in the sequence. Also, the values of the number identifiers similarly may not be sequential. For example, the first number identifier can have a value of 100, the second number identifier can have a value of 10, and the third number identifier can have a value of 120. As long as the number identifier or the encrypted number identifier for each number is available to the encryption system, the encryption system can encrypt numbers and decrypt aggregations of encrypted numbers. Also, the encryption system typically would not provide the encrypted number identifiers to a data storage system that stores the encrypted numbers.

Figure 6:
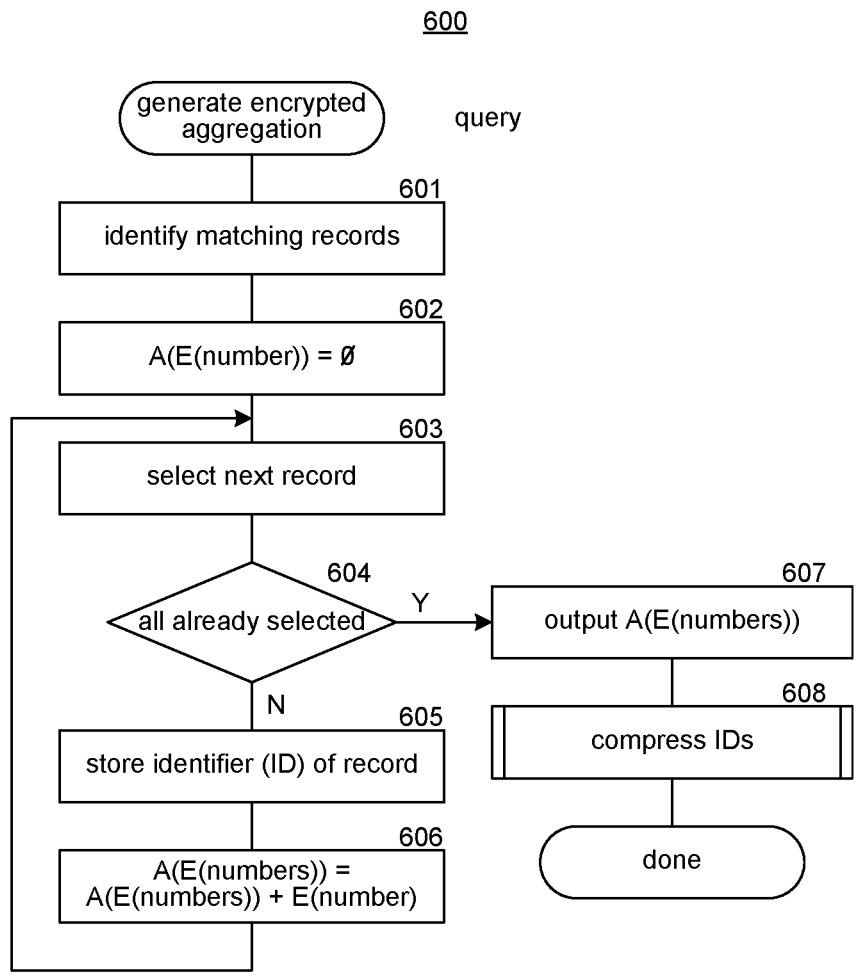
FIG. 6 is a flow diagram that illustrates processing of a generate encrypted aggregation component of a data storage system in some embodiments.

FIG. 6 is a flow diagram that illustrates processing of a generate encrypted aggregation component of a data storage system in some embodiments. A generate encrypted aggregation component 600 may be passed an indication of the query and return an aggregation of encrypted numbers that match the query. The query may be, for example, an SQL query. In block 601, the component identifies records with encrypted numbers that match the query. For example, the records may be entries of transaction table 120. In block 602, the component initializes an aggregation of the encrypted numbers. In blocks 603-606, the component loops adding each encrypted number of each identified record to the aggregation. In block 603, the component selects the next identified record. In decision block 604, if all such records have already been selected, then the component continues at block 607, else the component continues at block 605. In block 605, the component stores the number identifier of the encrypted number of the selected record. In block 606, the component adds the encrypted number of the selected record to the aggregation of the encrypted numbers and then loops to block 603 to select the next record. In block 607, the component outputs the aggregation of the encrypted numbers. In block 608, the component invokes a compress identifiers component to compress the stored number identifiers and then completes.

Figure 7:
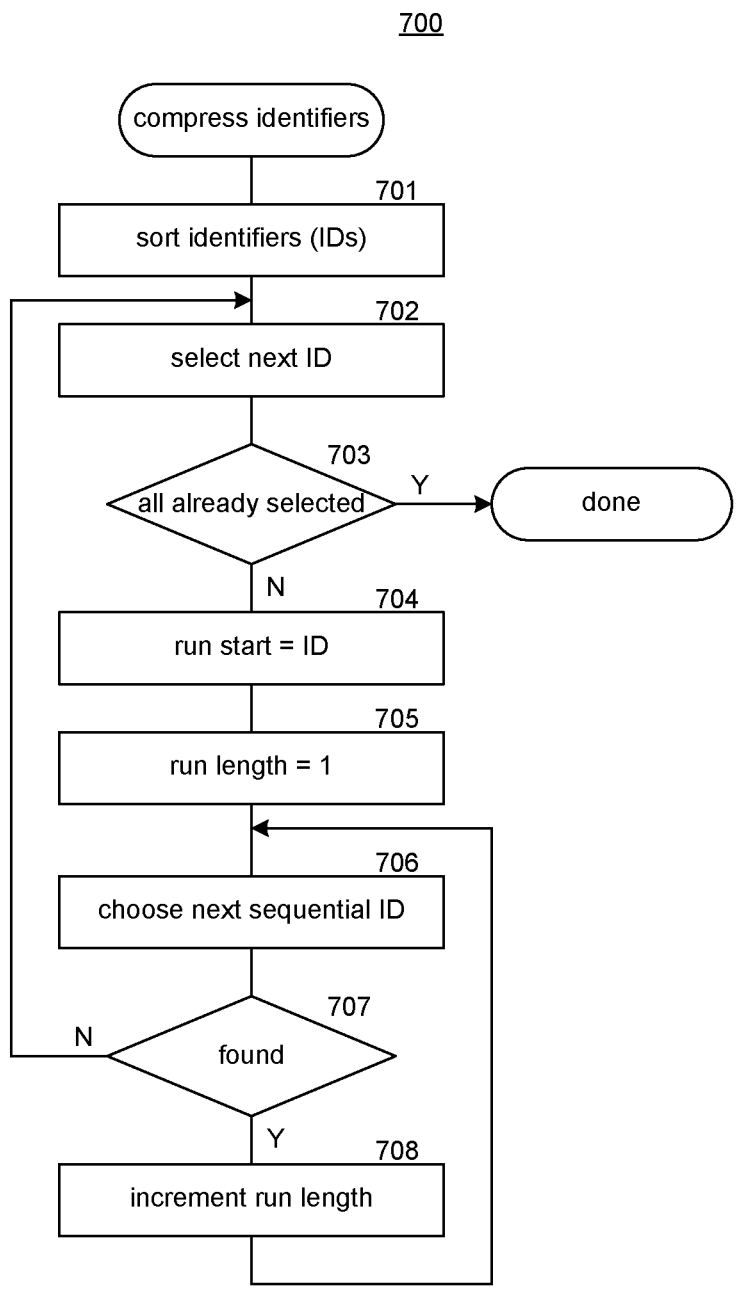
FIG. 7 is a flow diagram that illustrates processing of a compress identifiers component of a data storage system in some embodiments.

FIG. 7 is a flow diagram that illustrates processing of a compress identifiers component of a data storage system in some embodiments. A compress identifiers component 700 compresses the number identifiers of numbers used in the aggregation of encrypted numbers using run-length encoding. In this example, the values of the number identifiers are assumed to be sequential. In block 701, the component sorts the number identifiers. In block 702, the component selects the next number identifier. In decision block 703, if all the number identifiers have already been selected, then the component completes, else the component continues at block 704. In block 704, the component initializes the start of the run to the selected number identifier. In block 705, the component sets the length of the run to one. In blocks 706-708, the component loops, choosing each sequential number identifier and incrementing the length of the run. In block 706, the component chooses the next sequential number identifier. In decision block 707, if a sequential number identifier is found, the component continues at block 708, else the component loops to block 702 to select the next number identifier for the next run. In block 708, the component increments the length of the run and then loops to block 706 to choose the next sequential number identifier.

Figure 8:
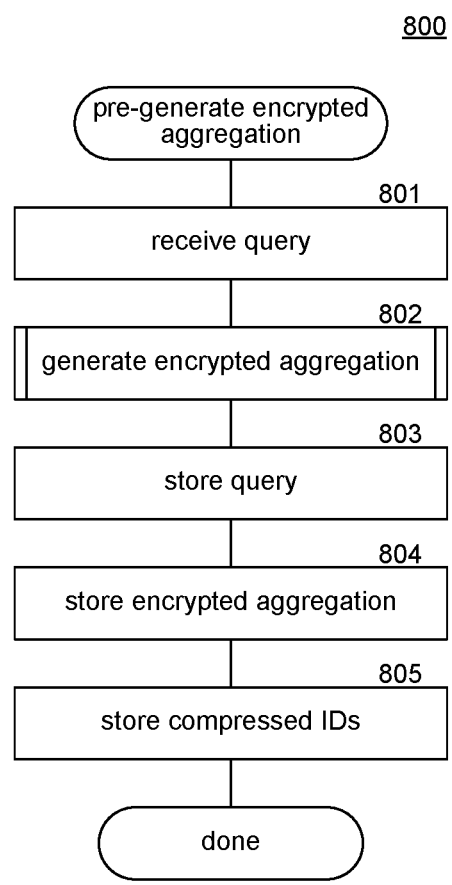
FIG. 8 is a flow diagram that illustrates processing of a pre-generate encrypted aggregation component of a data storage system in some embodiments.

FIG. 8 is a flow diagram that illustrates processing of a pre-generate encrypted aggregation component of a data storage system in some embodiments. A pre-generate encrypted aggregation component 800 may be used to generate aggregations of encrypted numbers and store those aggregations (possibly along with the corresponding number identifiers) for later retrieval. For example, a retail company may pre-generate aggregations of store sale amounts for each day, month, quarter, and year. In this way, queries that request the pre-generated aggregations can be satisfied using the pre-generated aggregations without having to aggregate the encrypted numbers at the time of the query. In block 801, the component receives a query for which an aggregation of encrypted numbers is to be pre-generated. In block 802, the component invokes the generate encrypted aggregation component passing an indication of the query to generate an aggregation that satisfies that query. In block 803, the component stores an indication of the query. In block 804, the component stores the encrypted aggregation. In block 805, the component stores the number identifiers used to generate the encrypted aggregation in compressed form and then completes. When a query is subsequently received that matches the stored query, the stored encrypted aggregation and the stored compressed number identifiers can be returned as a result of that query.

Figure 9:
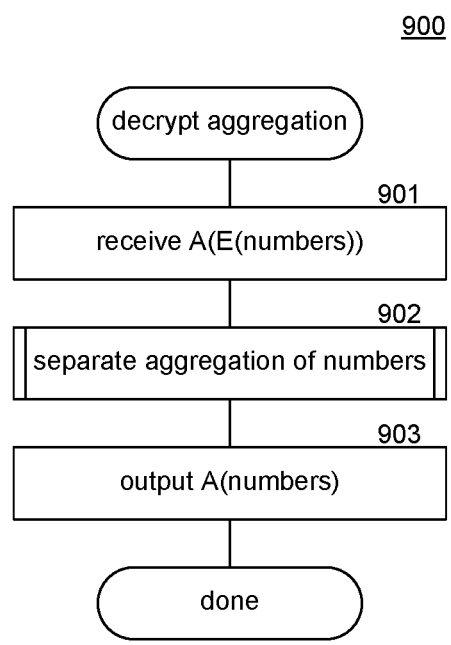
FIG. 9 is a flow diagram that illustrates processing of a decrypt aggregation component of a data consumer system in some embodiments.

FIG. 9 is a flow diagram that illustrates processing of a decrypt aggregation component of a data consumer system in some embodiments. A decrypt aggregation component 900 receives an aggregation of encrypted numbers and generates the corresponding aggregation of the numbers. In block 901, the component receives the aggregation of the encrypted numbers. In block 902, the component invokes a separate aggregation of numbers component. In block 903, the component outputs the aggregation of the numbers and then completes.

Figure 10:
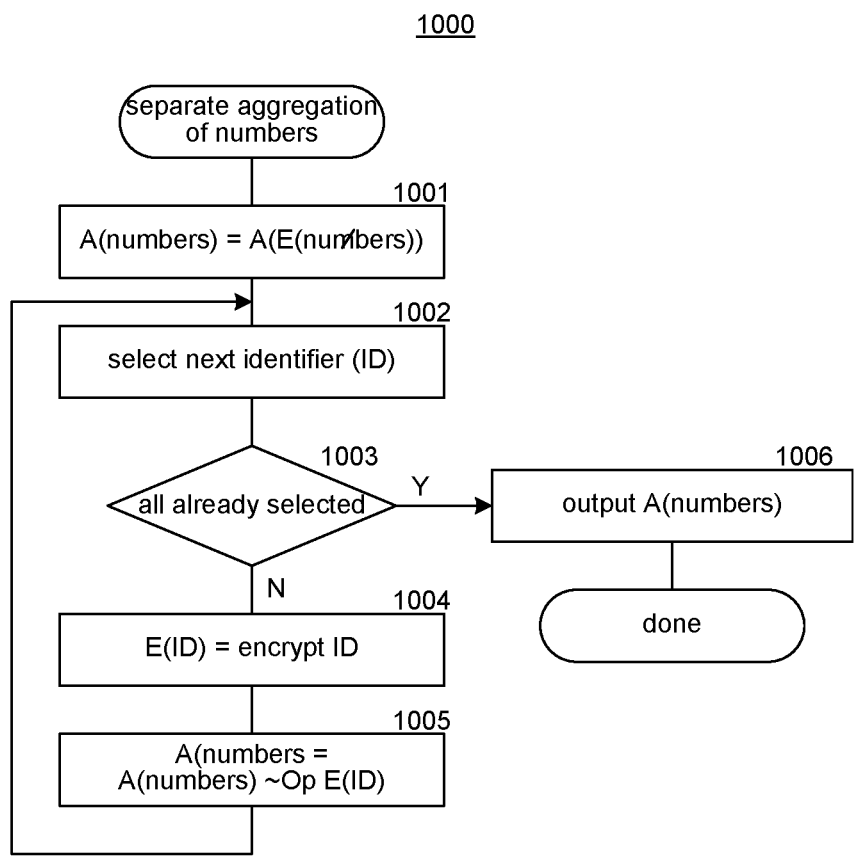
FIG. 10 is a flow diagram that illustrates processing of a separate aggregation of numbers component of a data consumer system in some embodiments.

FIG. 10 is a flow diagram that illustrates processing of a separate aggregation of numbers component of a data consumer system in some embodiments. A separate aggregation of numbers component 1000 is invoked to separate the aggregation of the numbers from the aggregation of the encrypted numbers. In block 1001, the component initializes the aggregation of the numbers to the aggregation of the encrypted numbers. In block 1002, the component selects the next number identifier of a number used in the aggregation. In decision block 1003, if all the number identifiers have already been selected, then the component continues at block 1006, else the component continues at block 1004. In block 1004, the component encrypts the selected number identifier. In block 1005, the component applies the reverse operation of the encrypted number identifier to the aggregation of the numbers. The component then loops to block 1002 to select the next identifier. In block 1006, the component outputs the aggregation of the numbers and then completes.

Figure 11:
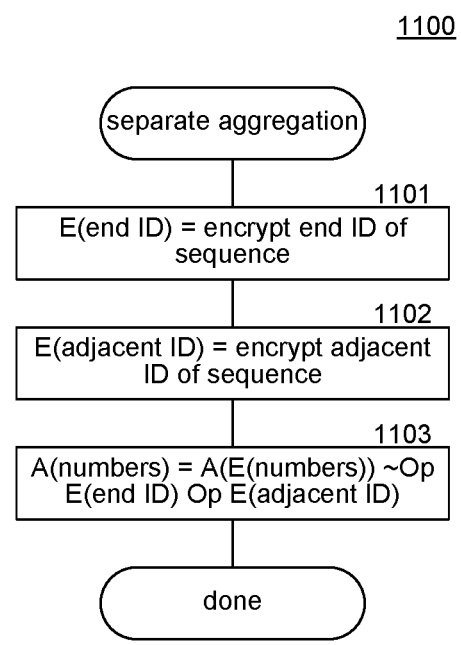
FIG. 11 is a flow diagram that illustrates processing of a separate aggregation component that employs sequential encryption of a data consumer system in some embodiments.

FIG. 11 is a flow diagram that illustrates processing of a separate aggregation component that employs sequential encryption of a data consumer system in some embodiments. A separate aggregation component 1100 may be passed an aggregation of encrypted numbers along with the number identifier of the first number and last number in a sequence. In block 1101, the component encrypts the number identifier of the last number in the sequence. In block 1102, the component encrypts the number identifier of the number before the first number in the sequence. In block 1103, the component performs both the inverse mathematical operation of the encryption of the last number identifier in the sequence and the mathematical operation of the number before the first number in the sequence on the aggregation of the encrypted numbers and completes. The result is the aggregation of the numbers that is not encrypted.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing device for securing data, the method comprising:
accessing a number identifier for each of a plurality of numbers;
encrypting the number identifier for each of the plurality of numbers to form a sequence;
combining, for each of the plurality of numbers and based on a sequential encryption, the number and the encrypted number identifier using a mathematical operation to generate an encrypted number, wherein the sequential encryption combines a number with its encrypted number identifier using a mathematical operation and an adjacent encrypted number identifier using an inverse mathematical operation; and
directing, for each of the plurality of numbers, that the encrypted number be stored,
wherein an aggregation of numbers is separated from an aggregation of encrypted numbers by using the inverse mathematical operation to effect removal of an encrypted number identifier of the number identifier at one end of the sequence and using the mathematical operation to effect removal of an encrypted number identifier of a number identifier that is adjacent to the other end of the sequence.

2. The method of claim 1 further comprising:
receiving an aggregation of the plurality of encrypted numbers; and
wherein the separated aggregation of the numbers is an aggregation of the plurality of numbers.

3. The method of claim 2 wherein the directing directs the storage of the encrypted numbers at a server system and the aggregation of the plurality of encrypted numbers is performed by the server system.

4. The method of claim 3 further comprising receiving from the server system an indication of the number identifiers of the plurality of numbers.

5. The method of claim 4 wherein values of the number identifiers of the plurality of numbers are sequential and the received indication of the number identifiers is a compressed form of the number identifiers.

6. The method of claim 2 further comprising directing the generation of the aggregation of the encrypted numbers.

7. A method performed by a computing device, the method comprising:
receiving an aggregation of a plurality of encrypted numbers encrypted using a sequential encryption, each encrypted number being a combination of a number and an encrypted number identifier of the number based on a mathematical operation and a sequential encryption, wherein the number identifiers form a sequence and the sequential encryption combines a number with its encrypted number identifier using the mathematical operation and an adjacent encrypted number identifier using an inverse mathematical operation;
separating an aggregation of the numbers from the aggregation of the encrypted numbers using an inverse of the mathematical operation to effect removal of an aggregation of the encrypted number identifiers of the numbers from the aggregation of the encrypted numbers at one end of the sequence and using the mathematical operation to effect removal of an encrypted number identifier of a number identifier that is adjacent to the other end of the sequence,
wherein the separated aggregation of the numbers is an aggregation of the plurality of numbers; and
directing, for each of the plurality of numbers, that the encrypted number stored.

8. The method of claim 7 further comprising, prior to receiving the aggregation of the plurality of encrypted numbers, directing the plurality of encrypted numbers to be aggregated.

9. The method of claim 7 further comprising receiving an indication of the number identifiers of the plurality of encrypted numbers.

10. The method of claim 9 wherein the number identifiers of the plurality of numbers are sequential and the received indication of the number identifiers is a compressed form of the number identifiers.

11. A method performed by a computing system, the method comprising:
receiving a plurality of encrypted numbers, each encrypted number being a combination of a number and an encrypted number identifier of a number identifier of the number, the combination based on a mathematical operation and a sequential encryption, wherein the number identifiers form a sequence and the sequential encryption combines a number with its encrypted number identifier using the mathematical operation and an adjacent encrypted number identifier using an inverse mathematical operation;
storing the plurality of encrypted numbers;
generating a reversible aggregation of the encrypted numbers;
providing the reversible aggregation of the encrypted numbers; and
separating a reversible aggregation of numbers from the reversible aggregation of encrypted numbers by using the inverse mathematical operation to effect removal of the encrypted number identifier at one end of the sequence and using the mathematical operation to effect removal of the encrypted number identifier that is adjacent to the other end of the sequence.

12. The method of claim 11 further comprising receiving a request for the aggregation of the numbers and wherein the providing is responsive to the request.

13. The method of claim 11 further comprising receiving the number identifiers and wherein the providing further provides an indication of the number identifiers of the numbers to support the separation of the aggregation of the numbers.

* * * * *